US011945058B2

United States Patent
Artelsmair et al.

(10) Patent No.: US 11,945,058 B2
(45) Date of Patent: Apr. 2, 2024

(54) METHOD FOR SYNCHRONIZING WELDING CURRENTS, AND WELDING CURRENT SOURCE AND SYSTEM COMPRISING AT LEAST TWO WELDING CURRENT SOURCES

(71) Applicant: Fronius International GmbH, Pettenbach (AT)

(72) Inventors: Josef Artelsmair, Pettenbach (AT); Peter Lattner, Pettenbach (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 27 days.

(21) Appl. No.: 18/015,572

(22) PCT Filed: Sep. 16, 2021

(86) PCT No.: PCT/EP2021/075413
§ 371 (c)(1),
(2) Date: Jan. 11, 2023

(87) PCT Pub. No.: WO2022/058398
PCT Pub. Date: Mar. 24, 2022

(65) Prior Publication Data
US 2023/0271265 A1   Aug. 31, 2023

(30) Foreign Application Priority Data
Sep. 17, 2020   (EP) .................................... 20196640

(51) Int. Cl.
*B23K 9/10*   (2006.01)
(52) U.S. Cl.
CPC .................. *B23K 9/1075* (2013.01)
(58) Field of Classification Search
CPC ........................... B23K 9/1006; B23K 9/1075
(Continued)

(56) References Cited

U.S. PATENT DOCUMENTS

| 7,041,936 B2 | 5/2006 | Oberzaucher et al. |
| 8,242,410 B2 | 8/2012 | Peters |

(Continued)

FOREIGN PATENT DOCUMENTS

| CN | 1592666 A | 3/2005 |
| CN | 101474709 B | 9/2011 |

(Continued)

OTHER PUBLICATIONS

Chinese Office Action in Chinese Application No. 202180049790.0 dated Apr. 27, 2023 with English translation.

(Continued)

*Primary Examiner* — Dana Ross
*Assistant Examiner* — James F Sims, III
(74) *Attorney, Agent, or Firm* — Collard & Roe, P.C.

(57) ABSTRACT

A method for synchronizing welding currents of at least two welding current sources prior to performing a simultaneous welding process on at least one workpiece, in particular a welding process with non-consumable electrodes, wherein the method includes the following steps: a first welding current source outputting a reference signal, wherein the reference signal contains synchronization information; a second welding current source measuring or receiving the reference signal and evaluating the synchronization information contained in the reference signal; synchronizing a second welding current of the second welding current source with a first welding current of the first welding current source on the basis of the synchronization information. The invention furthermore relates to a welding current source and to a system having at least two welding current sources.

13 Claims, 6 Drawing Sheets

Figure 1:
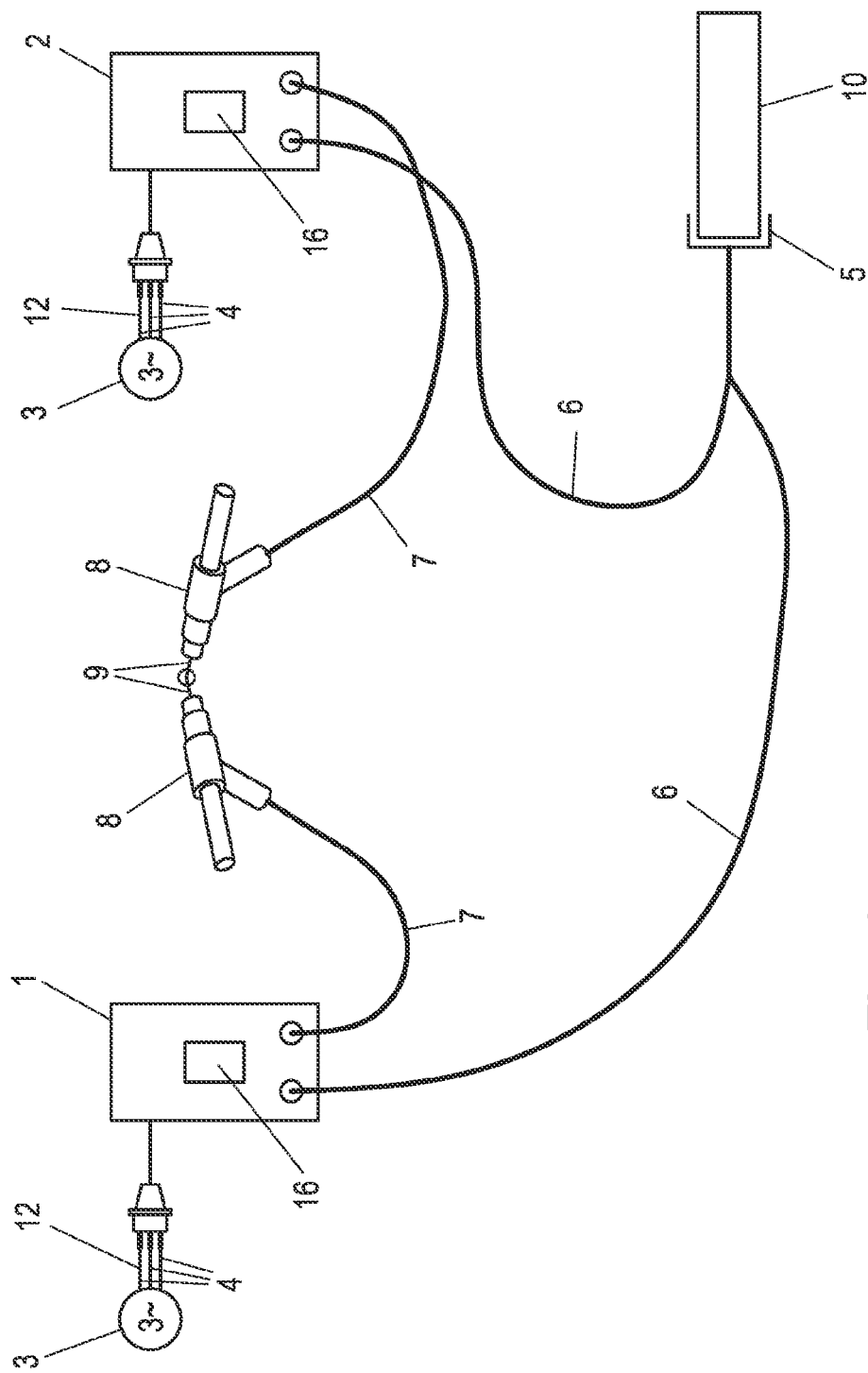

(58) Field of Classification Search
USPC .................................................. 219/130.32
See application file for complete search history.

(56) References Cited

U.S. PATENT DOCUMENTS

| | | | |
|---|---|---|---|
| 2004/0026391 A1 | 2/2004 | Oberzaucher et al. | |
| 2008/0011728 A1 | 1/2008 | Peters et al. | |
| 2010/0213179 A1* | 8/2010 | Peters .................. | B23K 26/348 |
| | | | 219/121.64 |
| 2019/0372451 A1* | 12/2019 | Nelson ................... | H02M 7/06 |

FOREIGN PATENT DOCUMENTS

| | | |
|---|---|---|
| CN | 102892544 A | 1/2013 |
| CN | 104096954 A | 10/2014 |
| EP | 1 043 107 A2 | 10/2000 |
| JP | H5-159895 A | 6/1993 |
| JP | H07-141010 A | 6/1995 |
| JP | 2017-188974 A | 10/2017 |
| JP | 2020082176 A | 6/2020 |

OTHER PUBLICATIONS

International Search Report in PCT/EP2021/075413, dated Dec. 9, 2021.
European Search Report in EP 20196640.5-1016, dated Mar. 29, 2021, with English translation of relevant parts.
Japanese Office Action dated Aug. 8, 2023 in Japanese Application 2023-512469, with Office Action Summary in English.

\* cited by examiner

METHOD FOR SYNCHRONIZING WELDING CURRENTS, AND WELDING CURRENT SOURCE AND SYSTEM COMPRISING AT LEAST TWO WELDING CURRENT SOURCES

CROSS REFERENCE TO RELATED APPLICATIONS

This application is the National Stage of PCT/EP2021/075413 filed on Sep. 16, 2021, which claims priority under 35 U.S.C. § 119 of European Application No. 20196640.5 filed on Sep. 17, 2020, the disclosure of which is incorporated by reference. The international application under PCT article 21(2) was not published in English.

The invention relates to a method for synchronizing welding currents of at least two welding current sources for performing a simultaneous welding process on at least one workpiece, in particular a welding process with non-consumable electrodes.

The invention furthermore relates to a welding current source for performing a simultaneous welding process on at least one workpiece, in particular a welding process with non-consumable electrodes, and a system comprising at least two welding current sources.

Simultaneous welding processes are often performed by means of several AC welding current sources when producing (aluminum) tanks, barrels, or silos. The edges or joints of the tanks, barrels, or silos are thereby welded simultaneously from two sides—mostly from the inside and the outside. A welding process of this type is shown, for example, in CN 101474709 B or in CN 104096954 A.

The welding currents generated by AC welding current sources are usually synchronized with a phase conductor or a phase of the alternating current network, respectively, to which the welding current sources are connected. In the case of simultaneous welding processes with several AC welding current sources, it can happen that a welding current or an arc, respectively, jumps at least intermittently from the workpiece to an electrode of another welding torch when the welding currents of the AC welding current sources are synchronized with different phase conductors of the alternating current network or with different synchronization points (e.g. zero crossings of the voltage curve) of the phase conductor, and the electrodes of the welding torches are guided spatially close to one another. In the extreme case, a positive voltage is present on the electrode of the one welding torch and a negative voltage is present on the electrode of the other welding torch when the welding currents are not synchronized, so that a mutual jump-over of the welding currents from the workpiece to the respective other electrode takes place during the welding process due to the mentioned different polarity and/or a spatial contact of the arcs.

A jump-over of welding currents onto another electrode can interfere with the welding process or even make it impossible, depending on the duration. To thus avoid a jump-over of the welding currents, a switch-over means is thus often provided in the case of welding current sources from the prior art, which makes it possible to synchronize the welding current of the welding current source with another phase conductor of the alternating current network or another zero crossing of the voltage curve. By means of the switch-over means, a welding current source can be switched over manually until the welding currents of the welding current sources are synchronized, and a jump-over of the welding currents no longer takes place. A control as to whether the welding currents are synchronized currently takes place by means of a visual control by the welder. In many cases, however, an incorrect synchronization of welding currents is difficult to detect. The welding currents are typically synchronized with the zero crossings in the voltage curve of a phase conductor. In the case of a three-phase alternating current network, a total of six possible synchronization points typically result due to the zero crossings of the phase voltages of the alternating current network. A manual setting of the welding current synchronization is therefore difficult and complex.

It is known from JP 2020 082176 A to perform a synchronization of welding current sources during a welding process. Corresponding signals for this are exchanged directly between the welding current sources.

Further welding methods comprising several welding current sources are known from EP 1 043 107 A2, US 2004/0026391 A1, and US 2008/0011728 A1.

In light of these explanations, it is the object of the present invention to reduce or to even completely eliminate the disadvantages of the prior art. It is in particular the object of the present invention to simplify the synchronization of the welding currents of at least two welding current sources.

This object is solved by means of a method disclosed herein, by means of a welding current source disclosed herein, and a system comprising at least two welding current sources disclosed herein.

According to the invention, the following steps are provided in the case of a method of the above-described type:
  outputting a reference signal by means of a first welding current source, wherein the reference signal contains synchronization information;
  measuring or receiving the reference signal and evaluating the synchronization information contained in the reference signal by means of a second welding current source;
  synchronizing a second welding current of the second welding current source with a first welding current of the first welding current source on the basis of the synchronization information.

A reliable and automatic synchronization of welding currents can advantageously be performed by means of at least two welding current sources with the help of the method according to the invention. A manual setting or switch-over, respectively, and controlling of the welding current sources as in the case of the prior art is thus no longer necessary. The synchronization of the welding currents takes place before the start of the welding process, thus before the welding currents for performing the welding process are output. The reference signal of the first welding current source for the synchronization can be transmitted in a wired manner or by means of a radio connection from the first welding current source to the second welding current source. In this context, "wired" means that the reference signal is transmitted via an electrical line connection from the first welding current source to the second welding current source. It can in particular be provided that the reference signal is guided to the second welding current source via a supply line of a first welding torch, which is connected to the first welding current source, and via a supply line of a second welding torch, which is connected to the second welding current source. For this purpose, the first and the second welding torch, in particular the electrodes thereof, must temporarily be brought into electrical contact with one another, so that an electrical connection is established between the first and the second welding current source. In the alternative, it can be provided that the reference signal is transmitted from the first welding current source to the second welding current source via a dedicated data connection line, which is independent of the welding torches. When the reference signal is transmitted via a radio connection, it can be provided that the first and the second welding current source each have a sending and/or receiving unit. Due to the fact that the reference signal is transmitted from the first welding current source to the second welding current source, the first welding current source can be referred to as "master" or "lead", and the second welding current source as "slave" or "trail". The reference signal is preferably an electrical voltage signal. To synchronize the welding currents, the reference signal contains synchronization information. The welding currents can be time-synchronized on the basis of this synchronization information, wherein the first welding current source specifies the synchronization. The synchronization information can be contained, for example, in the form of the reference signal, in particular in the time curve of the reference signal. The synchronization information can be contained, for example, in the frequency or periodicity, respectively, in the phase angle, in the amplitude, and/or in the polarity of the reference signal. The synchronization information preferably enables a synchronization of the welding currents to the effect that they essentially coincide in frequency or periodicity, respectively, phase angle and polarity. The synchronization information preferably lies in the periodicity and polarity of the reference signal. The reference signal can therefore specify a clock pulse, which is evaluated and adopted by the second welding current source. The transmission of the reference signal takes place prior to the welding process, so that the welding currents can already be synchronized prior to the output thereof for the welding process. The synchronization of the welding currents is maintained after the reference signal has been transmitted. The second welding current source stores the synchronization information and maintains the synchronization. In one embodiment, the reference signal is a periodic voltage signal, wherein a certain voltage level of the reference signal, for example zero crossings, minima, or maxima, or flanks of the reference signal are used to synchronize the welding currents. In the alternative, the synchronization information can also be contained in the reference signal in the form of a message, for example in the form of a time stamp, of a start command. The reference signal is measured or received by the second welding current source and is subsequently evaluated. In particular the synchronization information is evaluated thereby. The second welding current can be synchronized with the first welding current on the basis of the evaluated synchronization information. In this context, "synchronized" means that the time curves of the welding currents are adapted to one another. Preferably, "synchronized" means that the phase angles, polarities, and frequencies of the welding currents are adapted to one another, are in particular essentially identical. However, the amplitudes of the welding currents can be different. After the synchronization, the phase shift between the welding currents is to be essentially 0°. In a preferred embodiment, an external clock pulse generator, such as, for example, a phase conductor of a common alternating current network, is used to maintain the synchronicity. The phase conductors or the selected phase conductor, respectively, can be used as clock pulse generator by the first as well as by the second welding current source. In particular periodic synchronization points of a voltage curve of a phase conductor of an alternating current network, for example zero crossings, minima, or maxima of the voltage, can be used, for example, to synchronize the welding currents. By transmitting the reference signal, the second welding current source can be informed, for example, which phase conductor and which periodic synchronization points in the voltage curve of the phase conductor are to be used to synchronize the welding currents. To synchronize the welding currents, it is not yet necessary to actually generate and output the welding currents. The welding process, during which the synchronized welding currents are generated and output, can be performed after the synchronization. Due to the fact that the synchronization of welding currents plays an important role in particular in the case of the AC welding processes, the simultaneous welding process can be an AC welding process, in particular with non-consumable electrodes. The welding process can be, for example, a TIG-AC welding process (TIG=tungsten-inert gas; AC=alternating current). In particular AC welding current sources, which generate alternating currents as welding currents, can thus in particular be provided as welding current sources. Welding current sources are to be understood as all types of welding sources, thus also voltage-controlled welding sources.

It is preferred when after the synchronization, the synchronization information is stored in the first welding current sources and in the second welding current source. The synchronization information can in each case be stored in a synchronization unit of the welding current sources. The synchronization can thus be maintained.

In one embodiment, it is provided that after the synchronization of the first and of the second welding current, the first and the second welding current are generated and the welding process is performed. In other words, the welding process is performed after the synchronization with the synchronized welding currents.

The synchronization information is preferably contained in a time curve of the reference signal, in particular in a frequency, in a changing polarity, and/or in a phase angle of the reference signal. The reference signal is preferably a periodic signal. The reference signal can be, for example, a sinusoidal signal, a square-wave signal, or a signal with periodic pulses. The reference signal can have a duty cycle not equal to 50%. Additional information can be transmitted to the second welding current source by means of the duty cycle. For example, the switch-on time of the welding currents within a period can be reported by means of the duty cycle of the reference signal of the second welding current source. Certain signal levels of the reference signal, for example zero crossings, minima, or maxima, or flanks of the reference signal can be detected and evaluated by means of the second welding current source, and the synchronization of the second welding current can be performed on the basis thereof. The periodicity of the reference signal can be determined in a particularly simple way by means of the zero crossings of the reference signal.

As mentioned above, it is common in the case of AC welding current sources to synchronize the welding currents with a phase conductor of an alternating current network. Problems can occur, for example, when the welding currents are synchronized with different phase conductors of the alternating current network during a simultaneous welding process by means of several welding current sources. In a particularly preferred embodiment, it is thus provided that the first and the second welding current source are connected to a common alternating current network, in particular to a three-phase alternating current network, and that a phase conductor of the alternating current network is selected by means of the first welding current source for synchronizing the welding current sources, and the reference signal is generated on the basis of a voltage curve of the selected phase conductor, so that the synchronization information provides for an identification of the phase conductor, which is selected by means of the first welding current source, by means of the second welding current source. The voltage curve of the phase conductor can be measured, for example, against a neutral conductor or another phase conductor. It is thereby preferably provided that the reference signal is synchronized with the voltage curve of the selected phase conductor, in particular in the period. It is thus possible in a simple way to identify the selected phase conductor by means of the second welding current source, in that the reference signal is evaluated and is compared with the voltage curves of the phase conductors. It is not necessary, however, that the reference signal has the same form as the voltage curve of the selected phase conductor. In the case of this embodiment, a phase conductor or a phase of the alternating current network, respectively, is preferably initially selected by means of the first welding current source, a reference signal synchronized with the selected phase conductor is generated, the reference signal is transmitted from the first welding current source to the second welding current source, the reference signal is evaluated by means of the second welding current source, and the selected phase conductor is identified on the basis of the synchronization information. As will be described at once, the first and the second welding current can subsequently be synchronized with the selected phase conductor, i.e. the same phase conductor. The welding currents can thus still be kept synchronous even after the transmission of the reference signal because the selected phase conductor of the alternating current network specifies the clock pulse. In this context, "selecting" is to not mandatorily be understood as a selection process in the sense that a welder intentionally selects a phase conductor. On the contrary, the (random) selection can take place by means of the connection of the first welding current source to the alternating current network. In the case of this embodiment, it is the goal to inform the second welding current source with which phase conductor, in particular with which zero crossings or with which other periodic synchronization point in the voltage curve of the selected phase conductor the welding currents of the two welding current sources are to be synchronized in the future. It can be provided, for example, that the welding currents are synchronized with the zero crossings before a positive half-wave or with the zero crossings before a negative half-wave of the voltage curve of the selected phase conductor. This information can be reported to the second welding current source with the reference signal. The welding currents can thus still be kept synchronous, even if the welding current sources can no longer communicate with one another after transmission of the reference signal. The alternating current network thereby serves as base for the synchronicity of the welding currents.

After identification of the selected phase conductor by means of the second welding current source, the first welding current and the second welding current can be synchronized with the voltage curve of the selected phase conductor, in particular with a periodic synchronization point of the voltage curve of the selected phase conductor, for example a periodic zero crossing. The periodic synchronization point can generally be a certain, regularly recurring signal level of the voltage curve of the selected phase conductor. The periodic synchronization point can be, for example, a zero crossing, a minimum, or a maximum. In the case of a concrete exemplary embodiment, it can be provided, for example, that the positive half-wave of the welding currents is started as soon as the voltage curve of the selected phase conductor has a zero crossing in front of a positive half-wave. It is likewise conceivable, however, to start the positive half-wave of the welding current, as soon as the voltage curve of the selected phase conductor has a zero crossing in front of a negative half-wave. It can also be provided that the synchronization information contains a specification relating to the polarity of the welding currents.

It is preferred when the reference signal has a time curve, in particular a frequency and a phase position and a polarity, on the basis of which the selected phase conductor can be uniquely identified. The synchronization information thus lies within the time curve of the reference signal thereby. The reference signal can be synchronous with the selected phase conductor. The reference signal, however, can thereby have a different form and/or a different duty cycle than the voltage curve of the selected phase conductor.

In the case of an embodiment of the invention, it is provided that the synchronization information provides for the identification of a periodic synchronization point, for example of a periodic zero crossing, in the voltage curve of the selected phase conductor. This can take place, for example, in that the reference signal itself has a characteristic periodic curve. The reference signal can have, for example, pulses, zero crossings, and/or flanks, which coincide with certain zero crossings of the voltage curve of the selected phase conductor in terms of time. It can be provided, for example, that a zero crossing of the reference signal with a positive signal flank marks a periodic synchronization point in the voltage curve of the selected phase conductor. The first and the second welding current can be kept synchronous with the identified periodic synchronization point. The clock pulse is therefore specified by the alternating current network. It is preferably also provided that the synchronization information contains a specification relating to the polarity of the welding currents, so that the welding currents can also be adapted to one another in the polarity.

The synchronization information is preferably derived from the voltage curve of the selected phase conductor, in particular from the frequency, the polarity, and/or the phase angle of the selected phase conductor. It can in particular be provided that the derived synchronization information is used to generate the reference signal and is contained in the reference signal.

A particularly simple and quick identification of the selected phase conductor is made possible when a curve of the reference signal is synchronized with the voltage curve of the selected phase conductor in frequency, polarity, and/or phase angle. The form and/or the duty cycle of the reference signal can, but does not have to, have the form of the voltage curve of the selected phase conductor. The reference signal can be, for example, a periodic square-wave signal, or a signal with periodic pulses, while the voltage curve of the selected phase conductor is sinusoidal.

A particularly simple way of transmitting the reference signal follows when the reference signal is conducted directly or indirectly from the first welding current source via a first welding torch, which is connected to the first welding current source, to a second welding torch, which is connected to the second welding current source, and further to the second welding current source. It can thereby in particular be provided that the electrodes of the first and of the second welding torch are brought into electrical contact, in order to transmit the reference signal. In the alternative, it can also be provided that the electrodes of the welding torches touch the workpiece and that an electrical contact is thus established between the two electrodes.

The current intensity and the voltage level of the reference signal are preferably selected so that a melting of the workpiece, of a welding wire, or of the electrodes is avoided.

In one embodiment, it is provided that the reference signal is a voltage signal, preferably an alternating signal, in particular a square-wave signal.

The object set above is also solved by means of a welding current source disclosed herein. The welding current source is configured for performing a simultaneous welding process on at least one workpiece, in particular a welding process with non-consumable electrodes. According to the invention, the welding current source has a synchronization unit, which, in a first mode for the synchronization with a further similar welding current source, is configured to generate a reference signal with synchronization information and to output the reference signal to the further welding current source, and/or, in a second mode, to measure or to receive a reference signal output by the further welding current source, and to evaluate the synchronization information contained in the reference signal, and, on the basis thereof, to synchronize a welding current with a welding current of the further welding current source. The welding current source according to the invention is therefore configured to be used as first and/or second welding current source for the above-described method. To perform the above-described method, at least one welding source is thus used, which can be operated in the first mode, and a welding current source, which can be operated in the second mode. In an embodiment, which is preferred, in comparison, it is provided that the welding current source can be operated in the first as well as in the second mode. Such a welding current source can thereby advantageously be capable of being switched between the first and the second mode. To perform the above-described method, two similar welding current sources can advantageously be used in the case of this alternative. In terms of the method, one of the welding current sources can be used as first welding current source, in that it is operated in the first mode. In terms of the method, another welding current source can be used as second welding current source, in that it is operated in the second mode. The first welding current source thereby acts as "master" or "lead", while the second welding current source is operated as "slave" or "trail". The synchronization unit can be formed by means of a calculation unit, in particular by means of a microprocessor. With regard to the features and advantages of the method, reference is made to the above explanations, which also apply for the welding device.

In the first mode, the synchronization unit can be configured to generate the reference signal on the basis of a voltage curve of a selected phase conductor of an alternating current network. The reference signal can be synchronized with the voltage curve, for example in frequency and period, and can thus uniquely provide for an identification of the selected phase conductor.

The object is additionally solved by means of a system comprising two welding current sources, which are each formed as described above. The welding current sources can preferably be formed in such a way that they can each be switched between the first and the second mode. In the alternative, one of the two welding current sources can be operated exclusively in the first mode, and the other welding current source exclusively in the second mode, whereby no switch-over option for changing between the modes is present.

Figure 2A:
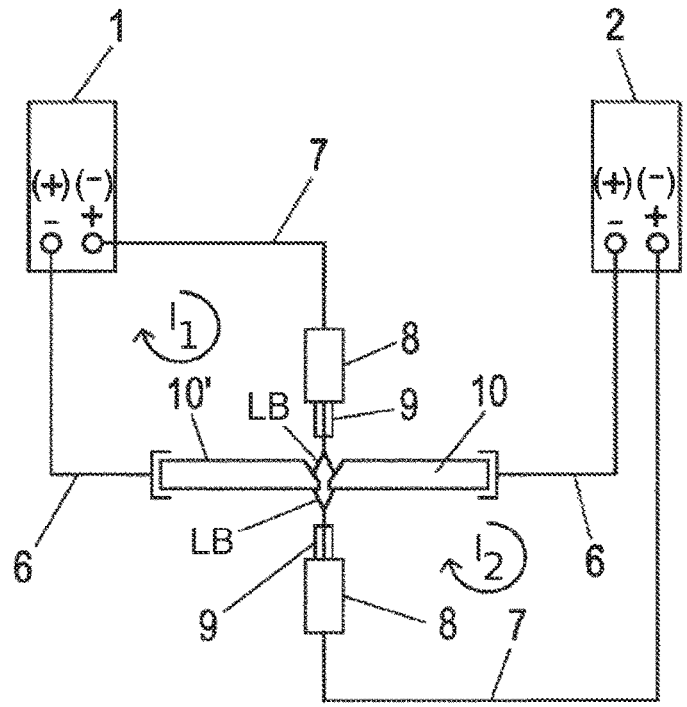
Figure 2B:
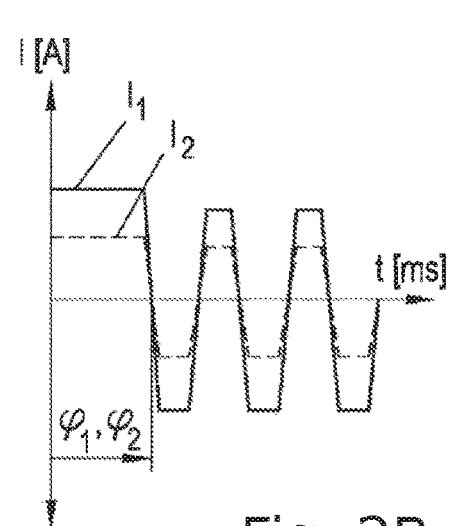
Figure 3A:
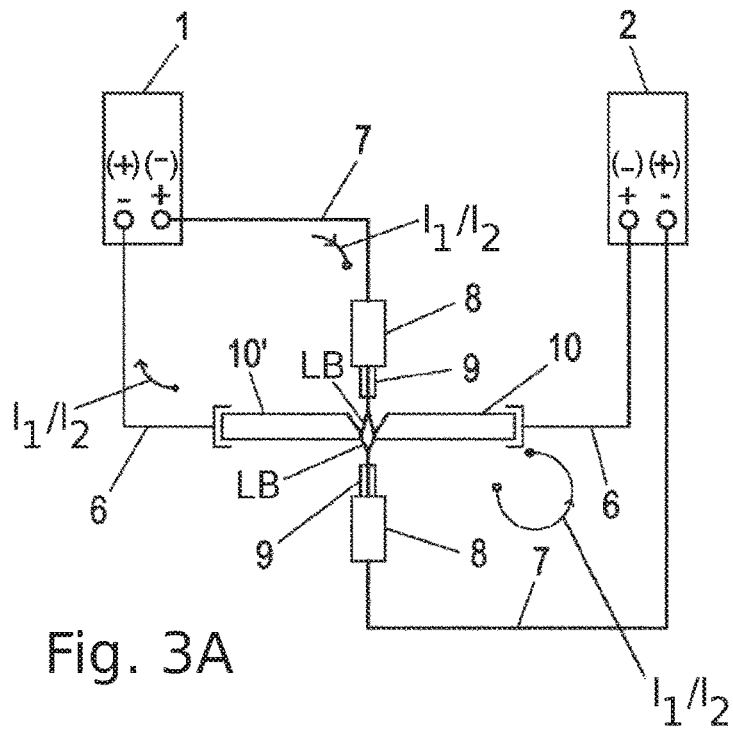
Figure 3B:
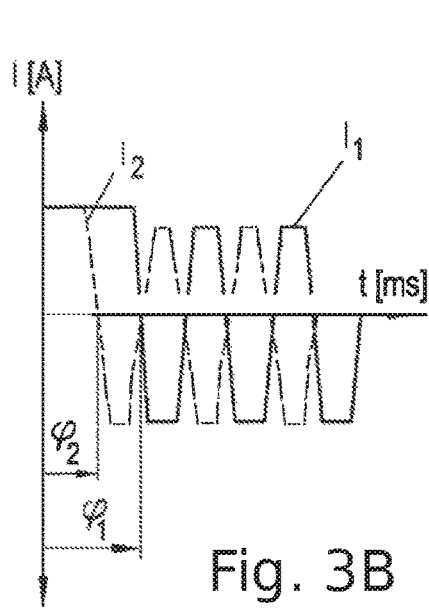
Figure 4A:
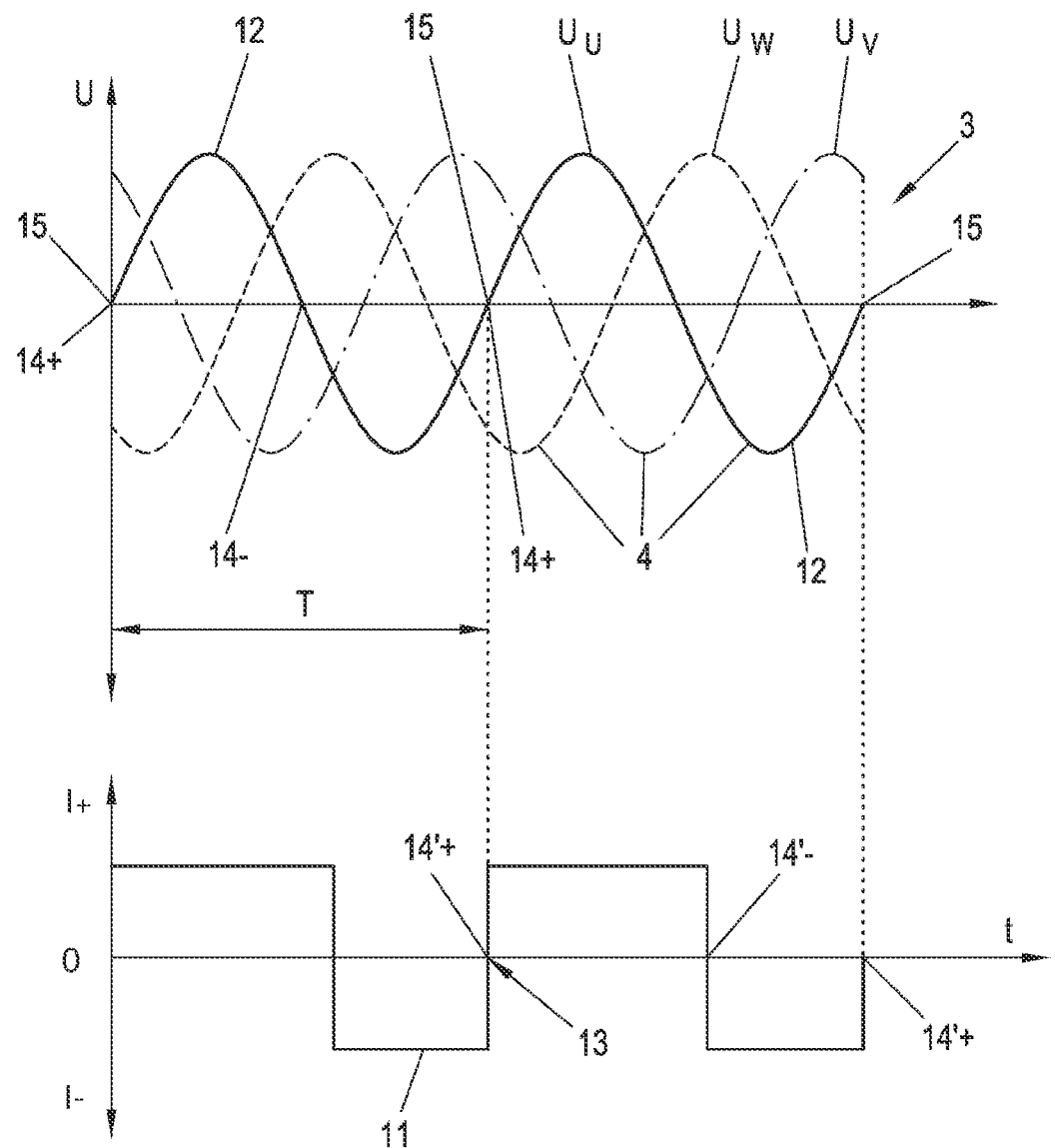
Figure 4B:
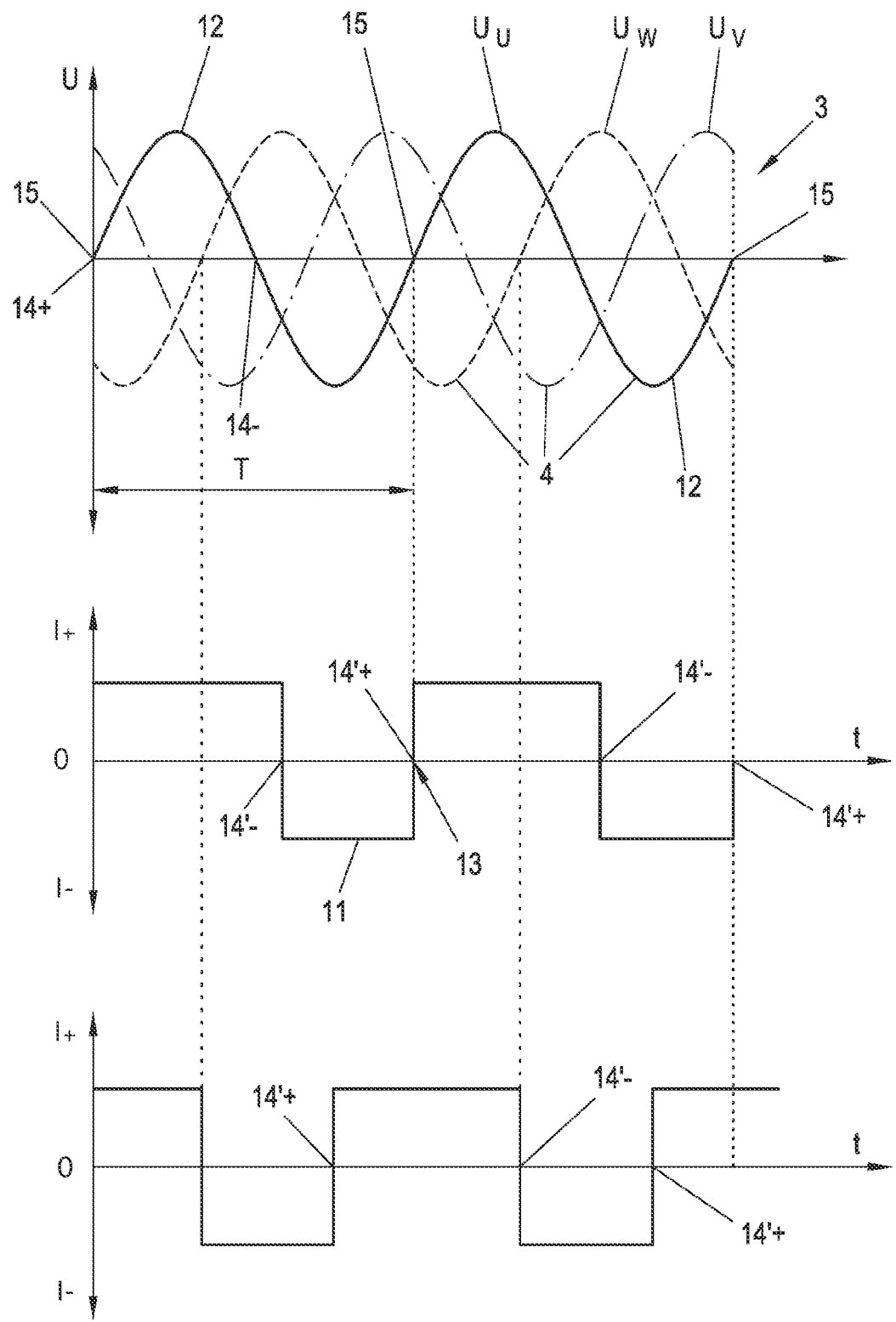
Figure 4C:
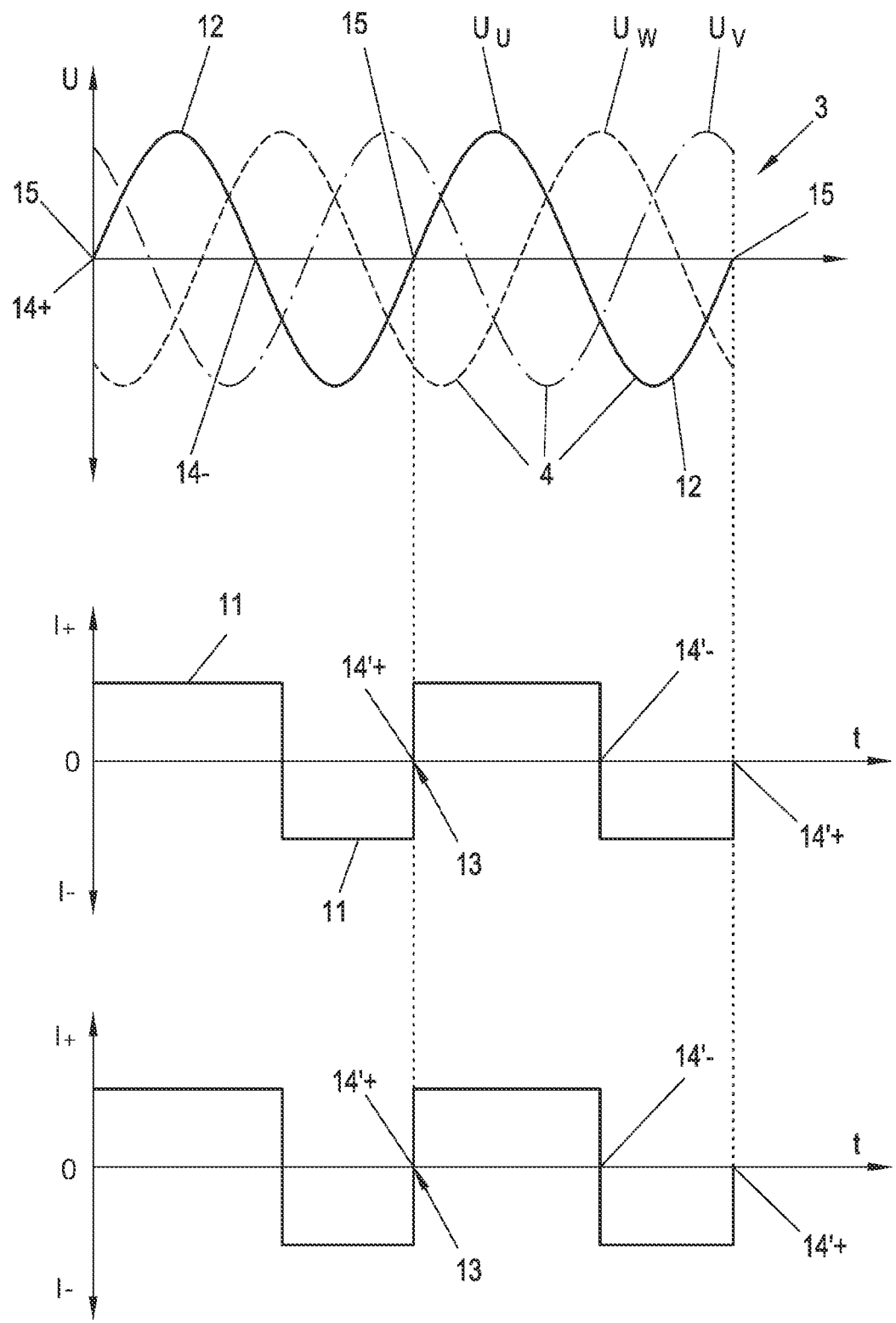
Figure 5A:
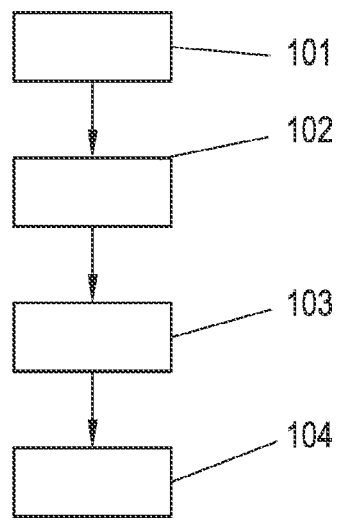
Figure 5B:
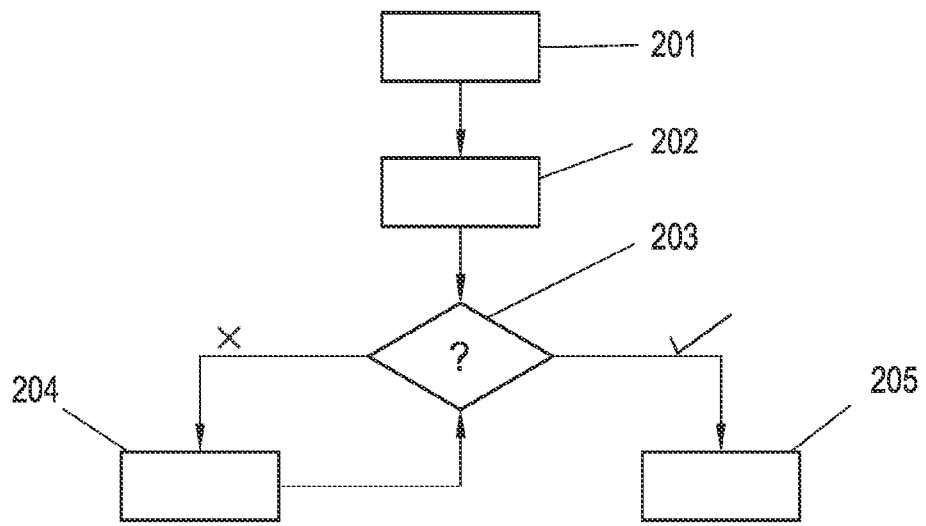

The invention will be described in more detail below on the basis of figures, to which it is not to be limited, however, in which:

FIG. 1 shows a first and a second welding current source;

FIG. 2A-B show, schematically, a simultaneous welding process with synchronized welding currents;

FIG. 3A-B show, schematically, a simultaneous welding process with welding currents, which are not synchronized; and FIG. 4A-C show, schematically, the synchronization of welding currents with the phase conductor $U_u$ of a three-phase alternating current network, wherein the voltages of the phase conductors are illustrated against the neutral conductor; and FIG. 5A and FIG. 5B show a process sequence for the synchronization of two welding current sources.

FIG. 1 shows a first welding current source 1 and a second welding current source 2, which are each connected to a symbolically illustrated common three-phase alternating current network 3 comprising three phase conductors 4. The two shown welding current sources 1, 2 are TIG-AC welding current sources for performing tungsten-inert gas welding processes with alternating currents (AC). It goes without saying that the current sources 1, 2 can also be used, for example, for pulse welding processes, which can be performed with direct current as well as with alternating current. The welding current sources 1, 2 are each electrically connected to a ground terminal 5 and thus to a workpiece 10 via a connecting line 6. A welding torch 8 comprising an electrode 9 is in each case furthermore connected to each welding current source 1, 2 via a supply line 7. The connecting lines 6 can be connected directly to one another or the workpieces 10 can be connected to one another via a common support (not illustrated).

The welding currents $I_1$, $I_2$ (see FIG. 2A, FIG. 3A), which are generated by welding current sources, are typically synchronized with the temporal voltage curve $U_{U,V,W}$ of a phase conductor 4 of the alternating current network 3, in particular with certain zero crossings 14 (which serve as periodic synchronization points 15) of a phase conductor 4. However, problems can arise when, as described above, several welding current sources 1, 2 are used during a welding process, and the generated welding currents $I_1$, $I_2$ are not synchronized. Then, it can happen that the arc LB is not directed as desired towards a workpiece 10, which is to be welded, during a welding process, but jumps from the workpiece 10 onto an electrode 9 of another welding torch 8 due to the resulting voltage difference (see FIG. 3A). The jump-over is in particular the case when—as illustrated—a gap is present between the workpieces 10, 10'. This results in a series connection of the welding current sources 1, 2 with a common electric circuit. This can interfere with the welding process or can even make it impossible, respectively. In the following, zero crossings 14 with a positive flank will be identified with a +, and zero crossings with a negative flank will be identified with a −.

A simultaneous welding process on two workpieces 10, 10' is illustrated schematically in FIG. 2A. The two workpieces 10, 10', for example the front sides of a pipe (not illustrated), are to be connected to one another with the help of the simultaneous welding process. Two welding current sources 1, 2 are used for this purpose, whereby the workpieces 10, 10' are welded simultaneously on two opposite sides of the workpieces 10, 10' by means of the welding torches 8. For this purpose, the workpieces 10, 10' are connected to the negative poles of the welding current sources 1, 2 via the connecting lines 6. The positive poles of the welding current sources 1, 2 are connected accordingly by means of the welding torches 8. It goes without saying that the poles can also be switched or the polarity of the welding current changes periodically during AC welding processes, respectively—according to the polarity identifiers in brackets (FIG. 2A and FIG. 3A). As already mentioned, the generated welding currents $I_1$, $I_2$ are synchronized with a phase conductor 4 of the alternating current network 3 in the case of AC welding current sources. When the welding currents $I_1$, $I_2$ are synchronized with the same phase conductor 4 or the same periodic synchronization point 15, respectively, in the voltage curve $U_{U,V,W}$ of the phase conductor 4, the welding currents $I_1$, $I_2$ are also synchronous with one another. This case is illustrated schematically in FIG. 2B. FIG. 2B shows synchronized welding currents $I_1$, $I_2$ in amperes over time t in milliseconds. The welding currents $I_1$, $I_2$ are essentially synchronous in the frequency f and in the schematically illustrated phase angles $\varphi_1$, $\varphi_2$. The amplitude of the welding currents $I_1$, $I_2$ is adapted accordingly to the use, and it goes without saying that it can also be different, as illustrated. Only for the sake of better visualization, $I_2$ is illustrated with dashed lines. It can be seen in FIG. 2A that the arcs LB are directed towards the workpieces 10, 10' in order to attain a heat input there. However, the welding currents $I_1$, $I_2$ flow in separate electric circuits—as illustrated symbolically—via the respective connecting lines 6, 7 of the respective welding current source 1, 2.

FIG. 3A shows a welding process, during which the welding currents $I_1$, $I_2$ are not synchronized (for example due to a synchronization with different zero crossings 14 in the voltage curve $U_{U,V,W}$ of a phase conductor 4). It can be seen that the arcs LB are not directed towards the workpieces 10, 10' in this case, but are at least intermittently directed towards the electrode 9 of the respective other welding torch 8. The heat input into the workpieces 10, 10' is significantly reduced thereby, and a correct welding seam formation is prevented. The non-synchronized welding currents $I_1$, $I_2$ are illustrated schematically in FIG. 3B in amperes over time t in milliseconds. It can be seen that the welding currents $I_1$, $I_2$ run exactly out of phase in terms of time, thus $\varphi_1-\varphi_2=180°$ electrically offset from one another. The polarities of the welding currents $I_1$, $I_2$ thus do not coincide. Only for the sake of better visualization, $I_2$ is illustrated with dashed lines. The welding currents $I_1$, $I_2$ are synchronous in the frequency f, but not in the phase angles $\varphi_1$, $\varphi_2$ or in the polarity, respectively. The amplitudes of the welding currents $I_1$, $I_2$ are illustrated essentially identically here because the arcs LB burn relative to one another and a series connection of the welding current sources 1,2 results. Due to the series connection, one of the welding current sources 1, 2 takes over the impression of a welding current $I_1$ or $I_2$ into the common electric circuit. Symbolically, the welding current $I_1$ is illustrated in the common electric circuit.

To synchronize the polarity of the welding currents $I_1$, $I_2$ of the welding current sources 1, 2 and to thus prevent a jump-over or a diversion, respectively, of the welding currents $I_1$, $I_2$ from the workpiece 10, 10' onto the electrodes 9, it is provided to transmit a reference signal 11, for example from the first welding current source 1 to the second welding current source 2 prior to the welding process (thus prior to the output of the welding currents $I_1$, $I_2$). The synchronization, in particular the generation and evaluation of the reference signal 11, can take place with the help of synchronization units 16 (see FIG. 1), which are arranged in the welding current sources 1, 2. The welding currents $I_1$, $I_2$ can be synchronized with one another on the basis of the reference signal 11. In the case of the shown embodiment, the reference signal 11 specifies, with which phase conductor 4 and with which periodic synchronization points 15, which are contained in the voltage curve $U_{U,V,W}$ of the phase conductor 4, the polarity, the frequency, and the phase position of the welding currents $I_1$, $I_2$ are to be synchronized. The transmission of the reference signal 11 between the welding current sources 1, 2 can take place via the welding torches 8, for example prior to the welding process. For this purpose, the electrodes 9 of the welding torches 8 can be brought into contact, until the reference signal 11 has been transmitted, and the synchronization is concluded. The contact of the electrodes 9 is illustrated in FIG. 1. The reference signal 11 is therefore transmitted prior to the welding process.

The time sequence for synchronizing the welding currents $I_1$, $I_2$ with regard to the phase conductors is illustrated in FIG. 4A-C, whereby FIG. 4A illustrates the reference signal 11 of the master, FIG. 4B illustrates a non-synchronized state, and FIG. 4C illustrates a synchronized state of the two current sources 1, 2. The time sequence is illustrated as measurement between the phase conductors 4 and the neutral conductor. It goes without saying that the measurement can also take place between the phase conductors. It is the goal of the shown embodiment to inform the second welding current source 2, which acts as "slave", with the help of the reference signal 11 prior to the welding process, with which phase conductor 4, in particular with which zero crossings 14 (more generally: periodic synchronization points 15) of the voltage curve $U_{U,V,W}$ of the selected phase conductor, the welding currents $I_1$, $I_2$ of the two welding current sources 1, 2 are to be synchronized in the future. Additional information, such as duty cycle and amplitude of the welding currents $I_1$, $I_2$ can also be reported to the second welding current source 2. The reference signal 11 to be transmitted is synchronized with the phase conductor 4, which is selected by means of the first welding current source 1, in frequency and period, whereby the phase conductor 4 can be identified on the basis of the reference signal. In the following, the selected phase conductor 4 will be identified with reference numeral 12. The welding currents $I_1$, $I_2$ can be kept synchronous during the subsequent welding/the welding process by means of the notification from the selected phase conductor 12 and the synchronization points 15, even if the welding current sources 1, 2 can no longer communicate with one another after conclusion of the transmission of the reference signal 11. The alternating current network 3 subsequently ensures the synchronicity in that the synchronization units 16 of the welding current sources 1, 2 were set to the synchronization points 15 of the alternating current network 3, which were reported by means of reference signal 11. The selected phase conductor 12, with which synchronization took place, is therefore stored in the welding current sources 1, 2. The synchronization information 13 is thus stored in the welding current sources 1, 2. The synchronicity of the welding currents $I_1$, $I_2$ is thus ensured for all welding processes, as long as the welding current sources 1, 2 remain connected to the alternating current network 3 and/or the phase sequence is not changed. The synchronization is to ensure that the welding currents $I_1$, $I_2$ are synchronous in frequency, phase angles, and polarity. The zero crossings 14 represent periodic synchronization points 15 in the voltage curve $U_{U,V,W}$ of the selected phase conductor 12, by means of which the welding currents $I_1$, $I_2$ can be synchronized. Due to its role in the process, the first welding current source 1 can also be referred to as "master"

or "lead". The selection as to which phase conductor 4 and which zero crossings 14 are to be used for the synchronization is made by the first welding current source 1. The voltage curve $U_{U,V,W}$ of the selected phase conductor 12 contains zero crossings 14+ with positive flanks as well as zero crossings 14− with negative flanks. In the shown exemplary embodiment, the zero crossings 14+ of the voltage curve $U_U$ with positive flanks are used as periodic synchronization points 15.

The selection of the phase conductor 12 can take place randomly, namely by means of the sequence of the connected phase conductors 4 during to the connection to the alternating current network 3. The second welding current source 2 is synchronized with the first welding current source 1 on the basis of the reference signal 11 in that the polarity and the phase position of the welding current $I_2$, which is to be output but has not been generated yet, of the second welding current source 2 is switched through gradually to the zero crossings 14 of the phase conductors 4, until the welding current $I_2$, which is to be generated, or the voltage curve thereof, respectively, is synchronous with the reference signal 11. At the end of the synchronization, both welding current sources 1, 2 synchronize their welding currents $I_1$, $I_2$, which are to be output, with the same phase conductor 4 and the same zero crossings 14+ of the voltage curve $U_U$. The frequency and phase position of the welding currents $I_1$, $I_2$, which are to be generated, is taken over by the selected phase conductor 12. The welding currents $I_1$, $I_2$ are synchronous in frequency, phase position, and polarity due to the synchronization to the same periodic synchronization points 15, in particular zero crossings 14+, of the selected phase conductor 12. The welding currents $I_1$, $I_2$, which are to be output, do not have to actually be generated and output for synchronization purposes.

A reference signal 11 with synchronization information 13 is initially generated and output by means of the first welding current source 1 (FIG. 4A). The synchronization information 13 thereby contains, for example, the information as to which phase conductor 4 (the selected phase conductor 12) and which zero crossings 14+ (positive flank) or 14− (negative flank), respectively, are used for the synchronization. In the shown exemplary embodiment, the zero crossings 14+ of the voltage curve $U_U$ with positive flanks are used as periodic synchronization points 15. The synchronization information 13 can further contain the amplitude of the welding current $I_2$ and the form of the welding current $I_2$. The reference signal 11 is thereby preferably not the welding current, but has a significantly lower level—for example 5 A. The synchronization information 13 can in particular be contained in the time curve of the reference signal 11, for example in the flanks or zero crossings 14′+ or 14′− of the reference signal. The reference signal 11 is adapted to the voltage curve $U_{U,V,W}$ of the selected phase conductor 12 with respect to the period duration or frequency, respectively, and is synchronized therewith. In the present case, the reference signal 11 is synchronous with the selected phase conductor 12 in the period T, as illustrated. A possible duty cycle of the reference signal 11, as illustrated in the figures, depends on user settings at the welding current sources 1, 2. The duty cycle can be different and has no impact on the synchronization. The duty cycle, thus the ratio of the duration of the positive and negative phase of the two welding currents 1, 2, is preferably set to be identical. The duty cycle of the welding currents $I_1$, $I_2$ impacts the heat input into the welding seam or on the cleaning zone of the welding seam, respectively, during the welding process. This is set accordingly by the user, depending on the use. This information is preferably contained in the reference signal 11, so that both welding current sources 1, 2 are set identically. In the shown case, the reference signal 11 is a square-wave signal, which coincides with the voltage curve of the selected phase conductor 12 with respect to the period duration and frequency, and which is thus synchronous. The zero crossings 14′+ of the reference signal 11 coincide with the zero crossings 14+ of the voltage curve of the selected phase conductor 12 in terms of time. The zero crossings 14′+ of the reference signal 11 mark periodic synchronization points 15 in the voltage curve of the selected phase conductor 12, with which the welding currents $I_1$, $I_2$ are to be synchronized. The phase positions of the voltage curve $U_U$ of the selected phase conductor 12 and of the reference signal 11 thus coincide. With the reference signal 11, the selected phase conductor 12 can be uniquely identified by means of the second welding current source 2, can thus be differentiated from the other phase conductors 4. The reference signal 11 can be transmitted to the second welding current source 2 via the welding torches 8. The second welding current source 2 can evaluate the reference signal 11 and can determine, which phase conductor 4 and which zero crossings (in the present case the zero crossings 14+) was selected by the first welding current source 1 for synchronizing the welding currents $I_1$, $I_2$. The determination which phase conductor 4 or which zero crossings 14, respectively, were selected, can take place by comparing the reference signal 11 to the voltage curves $U_{U,V,W}$ of the phase conductors 4. The comparison can take place consecutively, thus phase conductor 4 by phase conductor 4. The reference signal 11 is thereby in each case compared with a voltage curve $U_{U,V,W}$ of a phase conductor 4. The comparison takes place at least once, for example five times. If the comparison is negative (as illustrated, e.g., in FIG. 4B), the next phase conductor 4 is used or a switch-over is made from the second welding current source 2 to the next phase conductor 4, respectively, and is compared to the reference signal 11. An error synchronization of the second welding current source 2 is illustrated on the bottom in FIG. 4B, in the case of which the second welding current source 2 is synchronized to the phase conductor 4 with the voltage $U_W$. The phase conductor 4 with the voltage $U_W$, however, is not synchronous with the reference signal 11. As soon as the correct phase conductor 4 was identified, a control can be performed several times, for example five times in a row, whether it is the correct phase conductor 4 and the correct zero crossings 14+. Error synchronizations are avoided thereby. Both welding currents $I_1$, $I_2$ are subsequently synchronized with the same phase conductor 4, in particular with the same periodic synchronization points 15 or zero crossings 14, respectively, but are not output yet. When a simultaneous welding process is started, the synchronized welding currents $I_1$, $I_2$ can be output. This is illustrated in FIG. 4C. In summary, the first welding current source 1 thus selected a phase conductor 12, and a reference signal 11 was generated, which is adapted to the selected phase conductor 12 and certain periodic synchronization points 15 (the zero crossings 14+) in the voltage curve $U_{U,V,W}$ of the selected phase conductor 12. The reference signal 11 was transmitted to the second welding current source 2, and the selected phase conductor 12 and the certain periodic synchronization points 15 in the voltage curve $U_{U,V,W}$ of the selected phase conductor 12 was identified by means of the second welding current source 2 on the basis of the reference signal 11. The welding currents of the first 1 and of the second welding current source 2 were subsequently synchronized with the selected phase conductor 12 and the periodic synchronization points 15 contained in the voltage curve $U_{U,V,W}$. The welding currents $I_1$, $I_2$ can be output after the synchronization.

Two similar welding current sources 1, 2 can be used to perform the described method. They can in each case be capable of being switched over between a first mode and a second mode. In a first mode, the reference signal 11 can be generated and can be transmitted to a welding current source in the second mode. In the alternative, it can also be provided that the welding current sources cannot be switched over. A welding current source 1, which can be operated in the first mode, and a welding current source, which can be operated in the second mode, then has to be used to perform the method.

FIG. 5A shows the process sequence for synchronizing welding currents $I_1$, $I_2$, from the perspective of first welding current source 1 in the first mode. The method is started in step 101. In step 102, it is checked whether the welding torches 8 of the welding current sources 1, 2 are in electrical contact and whether an electrical current flows. In step 103, a reference signal 11 is output, which is essentially synchronous with the voltage curve of the selected phase conductor 12 in the period. A selected phase conductor 12 and periodic synchronization points 15 can be identified by the second welding current source 2 by means of the reference signal 11. The selection of the phase conductor 4 can take place randomly, for example by connecting the welding current source 2 to the alternating current network 3, or systematically. The reference signal 11 can be output, for example, for a certain time period. The method is ended on the part of the first welding current source 1 in step 104.

Parallel thereto, FIG. 5B shows the process sequence of the second welding current source 2 in the second mode. The method is started in step 201. It is checked in step 202, whether the welding torches 8 are in electrical contact and whether an electrical current flows. In step 203, the reference signal 11 is measured, evaluated, and compared with the voltage curve of a phase conductor 4. If the reference signal 11 is not synchronous with the compared phase conductor 4 (illustrated by means of the X), a switch-over to the next phase conductor 4 is performed in step 204, and step 203 is performed again. If the selected phase conductor 12 was identified (illustrated by means of the check mark), the method is also ended on the part of the second welding current source 2, optionally after repeated verification (step 205).

The invention claimed is:

1. A method for synchronizing welding currents of at least two welding current sources prior to performing a simultaneous welding process on at least one workpiece, wherein the method has the following steps:
connecting a first welding current source of the at least two welding current sources and a second welding current source of the at least two welding current sources to a common alternating current network;
selecting a phase conductor of the common alternating current network for the first welding current source for synchronizing the second welding current source and the first current welding source;
outputting a reference signal by means of the first welding current source, wherein the reference signal is generated on a basis of a voltage curve of the selected phase conductor and contains synchronization information;
measuring or receiving the reference signal and evaluating the synchronization information contained in the reference signal by means of the second welding current source;
synchronizing a second welding current of the second welding current source with a first welding current of the first welding current source on the basis of the synchronization information; and
identifying the selected phase conductor from the synchronization information by means of the second welding current source.

2. The method according to claim 1, wherein after the synchronization, a first welding current and a second welding current are generated, and the welding process is performed.

3. The method according to claim 1, wherein the synchronization information is contained in a time curve of the reference signal.

4. The method according to claim 1, wherein a first welding current and a second welding current are synchronized with the voltage curve of the selected phase conductor.

5. The method according to claim 1, wherein the reference signal has a time curve, on the basis of which the selected phase conductor can be uniquely identified.

6. The method according to claim 1, wherein the synchronization information contained in the reference signal provides for the identification of a periodic synchronization point in the voltage curve of the selected phase conductor.

7. The method according to claim 1, wherein the synchronization information is derived from the voltage curve of the selected phase conductor.

8. The method according to claim 1, wherein a curve of the reference signal is synchronized with the voltage curve of the selected phase conductor in frequency, polarity, and/or phase angle.

9. The method according to claim 1, wherein the reference signal is conducted directly or indirectly from the first welding current source via a first welding torch, which is connected to the first welding current source, to a second welding torch, which is connected to the second welding current source, and further to the second welding current source.

10. The method according to claim 1, wherein a current intensity and a voltage level of the reference signal are selected so that a melting of the workpiece, of a welding wire, or of electrodes of a welding torch is prevented.

11. The method according to claim 1, wherein the reference signal is a voltage signal.

12. A welding current source for performing a simultaneous welding process on at least one workpiece, wherein the welding current source has a synchronization unit, which, in a first mode for the synchronization with a further similar welding current source which is connected to a common alternating network, is configured to generate a reference signal on a basis of a voltage curve of a phase conductor of the common alternating current network selected for the welding current source with synchronization information prior to performing the welding process and to output the reference signal to the further similar welding current source, and/or, in a second mode, to measure or to receive a reference signal output by the further similar welding current source, and to evaluate the synchronization information contained in the reference signal, and, on a basis of the synchronization information, to synchronize a welding current of the welding current source with a welding current of the further similar welding current source prior to performing the welding process, wherein the synchronization information provides for an identification of the selected phase conductor by means of the further similar welding current source.

13. A system consisting of at least two welding current sources, wherein the welding current sources are each formed according to claim 12, and one of the two welding current sources is operated in the first mode, and the other welding current source is operated in the second mode.

\* \* \* \* \*